(12) United States Patent
Klein

(10) Patent No.: US 9,906,007 B2
(45) Date of Patent: Feb. 27, 2018

(54) GROMMETS FOR SUPPORTING HARNESSES AND SYSTEMS AND METHODS INCLUDING THE SAME

(71) Applicant: The Boeing Company, Huntington Beach, CA (US)

(72) Inventor: Steven E. Klein, Puyallup, WA (US)

(73) Assignee: The Boeing Company, Chicago, IL (US)

( * ) Notice: Subject to any disclaimer, the term of this patent is extended or adjusted under 35 U.S.C. 154(b) by 428 days.

(21) Appl. No.: 14/575,735

(22) Filed: Dec. 18, 2014

(65) Prior Publication Data

US 2016/0180988 A1 Jun. 23, 2016

(51) Int. Cl.
| | |
|---|---|
| *H01B 17/26* | (2006.01) |
| *H02G 3/22* | (2006.01) |
| *B64C 1/00* | (2006.01) |
| *F16L 5/02* | (2006.01) |
| *F16L 5/06* | (2006.01) |
| *F16L 5/10* | (2006.01) |

(52) U.S. Cl.
CPC ............... *H02G 3/22* (2013.01); *B64C 1/00* (2013.01); *F16L 5/027* (2013.01); *F16L 5/06* (2013.01); *F16L 5/10* (2013.01)

(58) Field of Classification Search
CPC ...... H01B 17/00; H01B 17/26; H01B 17/583; H05K 2201/2036; H05K 3/301; H05K 3/303; H05K 7/14; H05K 7/142; H02G 3/083; H02G 3/22; H02G 15/013; B60R 16/0222; B64C 1/00; F16L 5/027; F16L 5/06; F16L 5/10
See application file for complete search history.

(56) References Cited

U.S. PATENT DOCUMENTS

| | | | | | |
|---|---|---|---|---|---|
| 735,377 | A | * | 8/1903 | HOcheimer | ......... B65D 39/084 16/2.4 |
| 2,952,730 | A | * | 9/1960 | Simonds | ................ H02G 3/065 16/2.5 |
| 3,016,562 | A | * | 1/1962 | Reid | ......................... F16L 5/00 16/2.1 |
| 3,104,120 | A | * | 9/1963 | Ahlport | ................... F16L 41/14 174/51 |
| 4,234,218 | A | * | 11/1980 | Rogers | ................ B29C 61/0608 174/153 G |

(Continued)

*Primary Examiner* — Pete Lee
(74) *Attorney, Agent, or Firm* — DASCENZO Intellecutal Property Law, P.C.

(57) ABSTRACT

Grommets for supporting harnesses and systems and methods including the same are disclosed herein. The grommets include a grommet body, a resilient cushion, and a retention mechanism. The grommet body is configured to be received within an aperture that is defined by a structural component and defines a tubular receiving region that is sized to receive the harness. The resilient cushion is located within the tubular receiving region and is configured to extend between the harness and the grommet body. The retention mechanism is configured to selectively retain the grommet body within the aperture. The methods include locating the resilient cushion around an external surface of the harness, locating a first body portion and a second body portion around an external surface of the resilient cushion, and operatively interlocking the first body portion with the second body portion to form the grommet body.

15 Claims, 9 Drawing Sheets

(56) References Cited

U.S. PATENT DOCUMENTS

| | | | | |
|---|---|---|---|---|
| 4,301,325 A | * | 11/1981 | Hutchison | H02G 3/0616 |
| | | | | 156/242 |
| 6,010,134 A | * | 1/2000 | Katoh | B60R 16/0222 |
| | | | | 174/152 G |
| 6,114,630 A | * | 9/2000 | Gretz | H05K 13/00 |
| | | | | 174/51 |
| 6,218,625 B1 | * | 4/2001 | Pulaski | B60R 16/0222 |
| | | | | 174/153 G |

* cited by examiner

GROMMETS FOR SUPPORTING HARNESSES AND SYSTEMS AND METHODS INCLUDING THE SAME

GOVERNMENT RIGHTS

This invention was made with Government support under contract number N00019-04-C-3146, N00019-09-00022 awarded by the Department of Defense. The government has certain rights to this invention.

FIELD

The present disclosure relates to grommets for supporting harnesses.

BACKGROUND

An aircraft may include an electrical power harness that extends through apertures defined by frame members of the aircraft. It may be important to retain the electrical power harness at a desired location within the apertures, such as to prevent damage to the electrical power harness due to relative motion between the frame members and the electrical power harness. As an example, it may be desirable to center the harness within the aperture.

Historically, clamps have been utilized to retain the electrical power harness at the desired location within the apertures. These clamps bolt to tabs that extend from the frame member, and spacers are utilized to regulate the distance between the harness and the tabs, thereby regulating the location of the electrical power harness within the apertures. However, forces that may be applied to the electrical power harness, such as during installation thereof, often deflect the electrical power harness from the desired location within the apertures. Thus, it may be common to unbolt the clamps from the tabs and change the length of the spacers several times during installation of the electrical power harness to re-orient the electrical power harness relative to the apertures. This may be a time-consuming and/or expensive process. Thus, there exists a need for improved harness retention mechanisms, such as grommets, for supporting harnesses and for systems and methods that include the grommets.

SUMMARY

Grommets for supporting harnesses and systems and methods including the same are disclosed herein. The grommets include a grommet body, a resilient cushion, and a retention mechanism. The grommet body is configured to be received within an aperture that is defined by a structural component and defines a tubular receiving region that is sized to receive the harness such that the grommet body encircles at least an encircled portion of the harness when the harness and the grommet body are received within the aperture. The resilient cushion is located within the tubular receiving region and is configured to extend between the harness and the grommet body when the harness is received within the tubular receiving region. The resilient cushion is shaped to retain the harness at a desired cross-sectional location within the tubular receiving region. The retention mechanism is configured to selectively retain the grommet body within the aperture.

The methods include locating the resilient cushion around an external surface of the harness and locating a first body portion and a second body portion around an external surface of the resilient cushion. The methods further include operatively interlocking the first body portion with the second body portion to form the grommet body. The operatively interlocking includes defining the tubular receiving region with the grommet body such that the harness and the resilient cushion extend within the tubular receiving region.

DESCRIPTION

Figure 1:
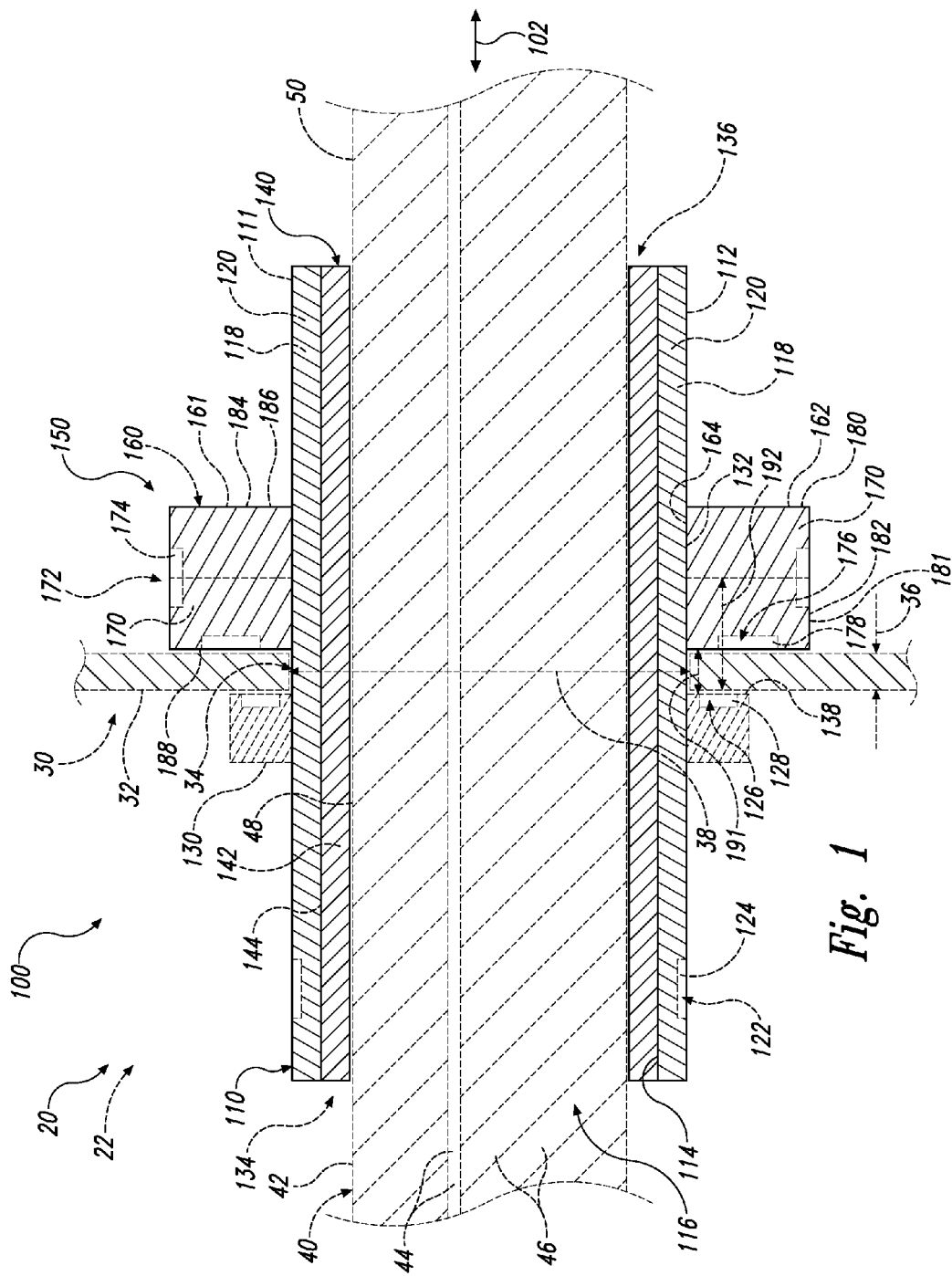
FIG. 1 is a schematic cross-sectional view of examples of a grommet according to the present disclosure.

FIGS. 1-14 provide examples of grommets 100, according to the present disclosure, of components of grommets 100, and/or of methods 200, according to the present disclosure, of installing a grommet. Elements that serve a similar, or at least substantially similar, purpose are labeled with like numbers in each of FIGS. 1-14, and these elements may not be discussed in detail herein with reference to each of FIGS. 1-14. Similarly, all elements may not be labeled in each of FIGS. 1-14, but reference numerals associated therewith may be utilized herein for consistency. Elements, components, and/or features that are discussed herein with reference to one or more of FIGS. 1-14 may be included in and/or utilized with any of FIGS. 1-14 without departing from the scope of the present disclosure.

In general, elements that are likely to be included in a given (i.e., a particular) embodiment are illustrated in solid lines, while elements that are optional to a given embodiment are illustrated in dashed lines. However, elements that are shown in solid lines are not essential to all embodiments, and an element shown in solid lines may be omitted from a given embodiment without departing from the *scope* of the present disclosure.

FIG. 1 is a schematic cross-sectional view of examples of a grommet 100 according to the present disclosure. Grommet 100 is configured to support a harness 40 within an aperture 34 that is defined by a structural component 30. Grommet 100 includes a grommet body 110. Grommet body 110 is configured to be received within aperture 34 and to extend between harness 40 and structural component 30, such as to protect harness 40 (or an external surface 50 thereof) from damage due to contact with and/or abrasion against structural component 30. Grommet body 110 has a tubular inner surface 114 that defines a tubular receiving region 116. Tubular receiving region 116 is sized to receive harness 40 such that grommet body 110 encircles, or completely encircles, an encircled portion 48 of harness 40. Encircled portion 48 of harness 40 may include at least a portion of harness 40 that passes through aperture 34.

Grommet 100 further includes a resilient cushion 140 that may have and/or define an external surface 144. Resilient cushion 140 is configured to extend between harness 40 and grommet body 110. In addition, resilient cushion 140 is sized, shaped, adapted, designed, and/or configured to retain harness 40 at a desired cross-sectional location within tubular receiving region 116.

Grommet 100 also includes a retention mechanism 150. Retention mechanism 150 is configured to selectively retain grommet body 110 within aperture 34, to interlock grommet 100 with structural component 30, and/or to operatively affix grommet 100 to structural component 30.

Harness 40 may include and/or be any suitable harness that may include, may be utilized to support, and/or may be utilized to convey any suitable electrical conduit, fluid conduit, and/or hydraulic conduit. As examples, harness 40 may include and/or be an electrical power harness 42 and/or an electrical power harness 42 for an aircraft 22. Harness 40 may include and/or define a plurality of air channels 44. As an example, and when harness 40 is the electrical power harness 40, harness 40 may include a plurality of (substantially cylindrical) wires 46, and air channels 44 may extend between and/or may be defined by wires 46. Air channels 44 may extend between a first side 134 and a second side 136 of tubular receiving region 116.

Structural component 30 may include and/or be any suitable component of a structural assembly 20. As an example, structural component 30 may include and/or be a frame member 32. Structural assembly 20 may include and/or be aircraft 22.

Grommets 100 according to the present disclosure may provide several benefits over conventional harness retention mechanisms that have traditionally been utilized to retain a harness within an aperture. As an example, grommets 100 may be simpler in design and/or construction, may be easier to install, and/or may include fewer parts than the conventional harness retention mechanisms. As an example, conventional harness retention mechanisms often utilize a spacer to regulate the cross-sectional location of the harness within the aperture, and these spacers often must be adjusted and/or changed during installation of the conventional harness retention mechanisms due to changes in the cross-sectional location of the harness. In contrast, grommets 100 according to the present disclosure securely retain harness 40 at the desired cross-sectional location within aperture 34 without the need for subsequent changes and/or adjustment during installation of the harness.

As another example, grommets 100 according to the present disclosure may be configured to securely retain harness 40 within tubular receiving region 116 without the need for (or without utilizing) a sealant material, or an adhesive, within tubular receiving region 116. This may simplify installation of grommets 100 and/or may permit utilization of grommets 100 without blocking, restricting, and/or occluding air channels 44 with the sealant material and/or with the adhesive. This may improve cooling of harnesses 40 that are supported by grommets 100 according to the present disclosure and/or may decrease a potential for hot spots within harnesses 40 that are supported with grommets 100. With the above discussion in mind, a sealant material may not be included in and/or may not be required to extend between grommet body 110 and harness 40 in grommets 100 according to the present disclosure. Additionally or alternatively, grommet body 110 and/or resilient cushion 140 may not be adhered to harness 40 during utilization of grommets 100 according to the present disclosure.

Grommet body 110 may include any suitable structure that may be received within (or be configured to be received within) aperture 34 and/or that may define tubular receiving region 116. In addition, grommet body 110 may be formed from any suitable material and/or materials. As examples, grommet body 110 may include and/or be formed from a polymeric material, a resin, an amorphous thermoplastic, and/or an amorphous thermoplastic polyetherimide resin.

In addition, grommet body 110 may include and/or define any suitable dimensions and/or characteristic dimensions and/or may be configured to support harness 40 within any suitable aperture 34. As examples, grommet 100 and/or grommet body 110 thereof may be sized to support harness 40 within an aperture 34 with an aperture inner diameter 38 of at least 1 cm, at least 1.5 cm, at least 2 cm, at least 2.5 cm, at least 3 cm, at least 3.5 cm, at least 4 cm, at least 4.5 cm, and/or at least 5 cm. Additionally or alternatively, grommet 100 and/or grommet body 110 thereof may be sized to support harness 40 within an aperture 34 with aperture inner diameter 38 of less than 7.5 cm, less than 7 cm, less than 6.5 cm, less than 6 cm, less than 5.5 cm, less than 5 cm, less than 4.5 cm, less than 4 cm, less than 3.5 cm, less than 3 cm, and/or less than 2.5 cm.

Figure 2:
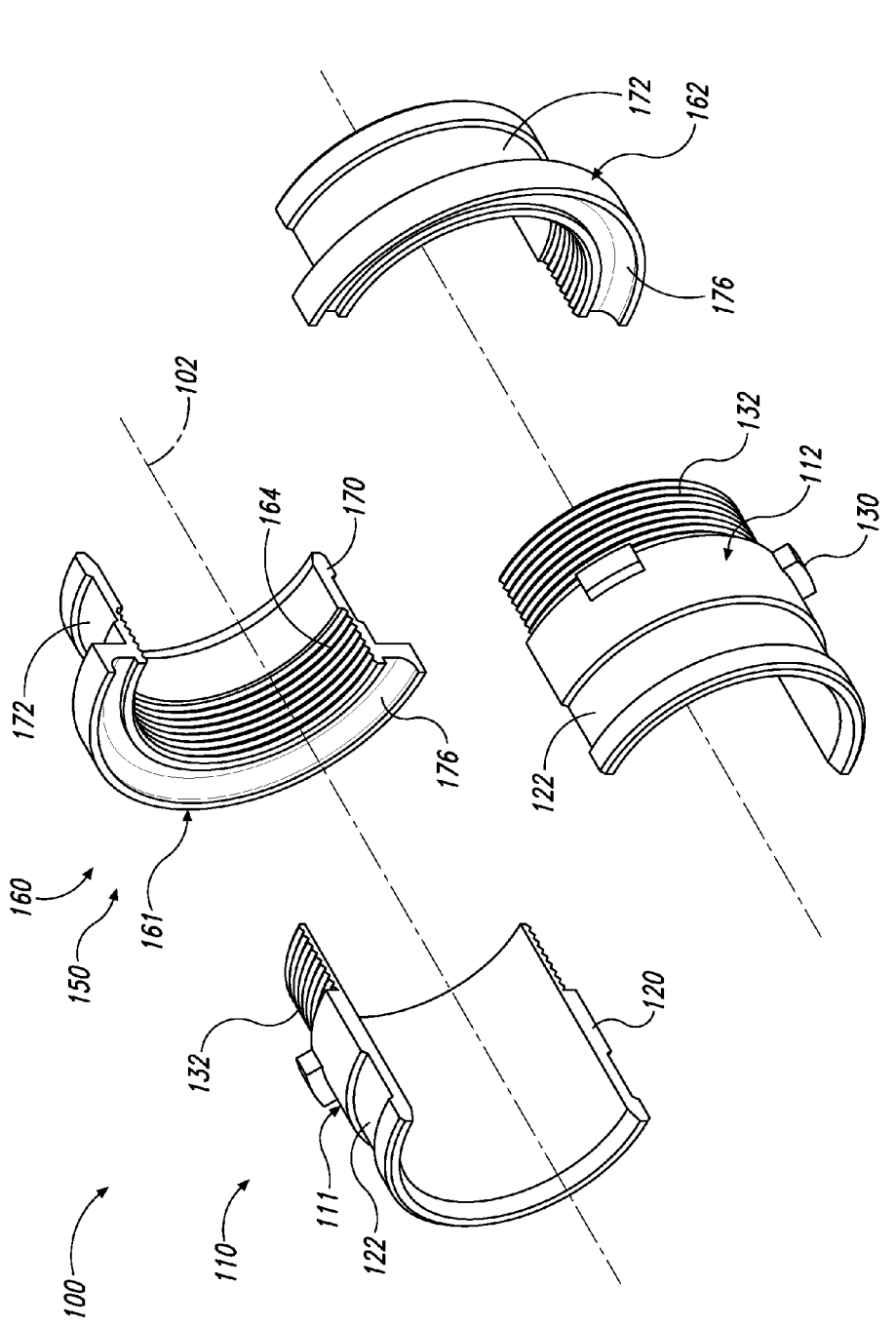
FIG. 2 is a less schematic exploded view of a grommet according to the present disclosure.
Figure 3:
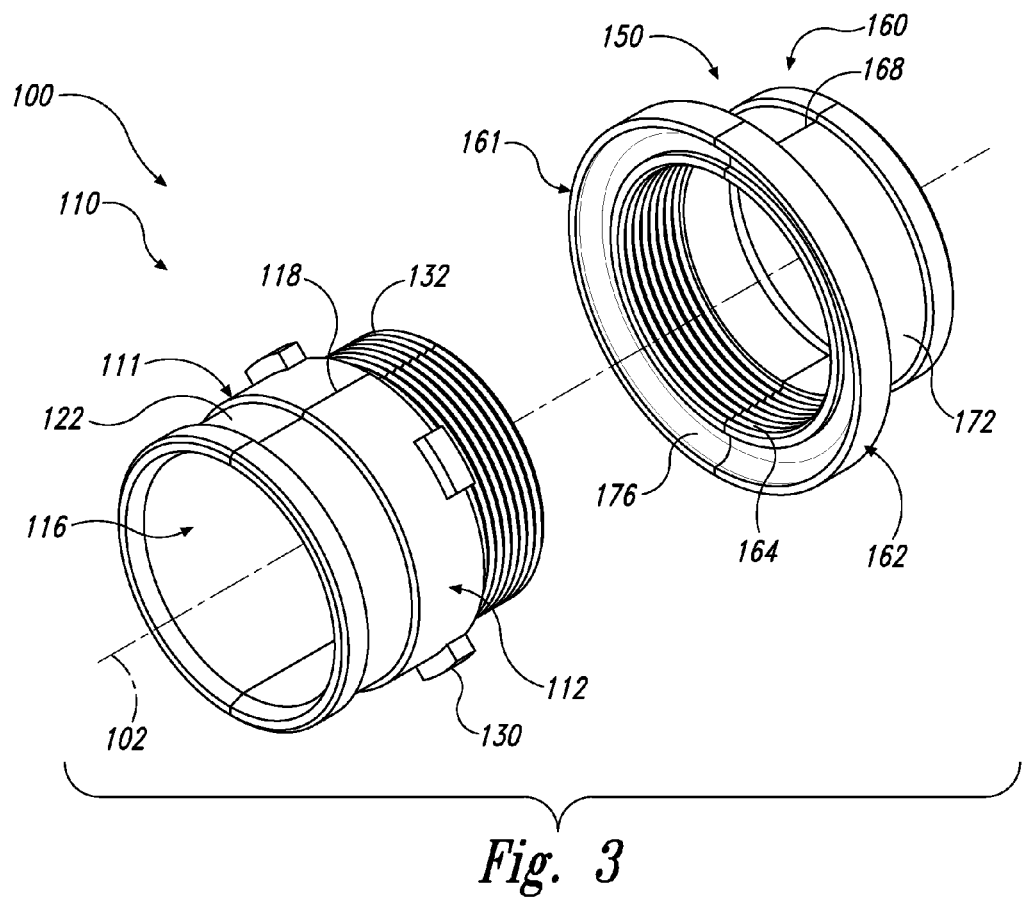
FIG. 3 is a partially assembled view of the grommet of FIG. 2.
Figure 4:
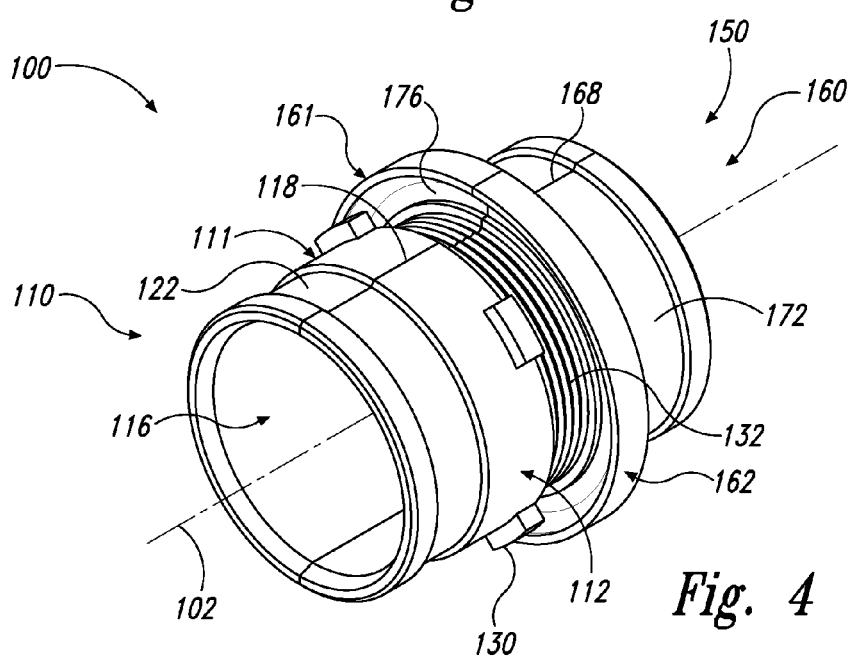
FIG. 4 is an assembled view of the grommet of FIG. 2.
Figure 9:
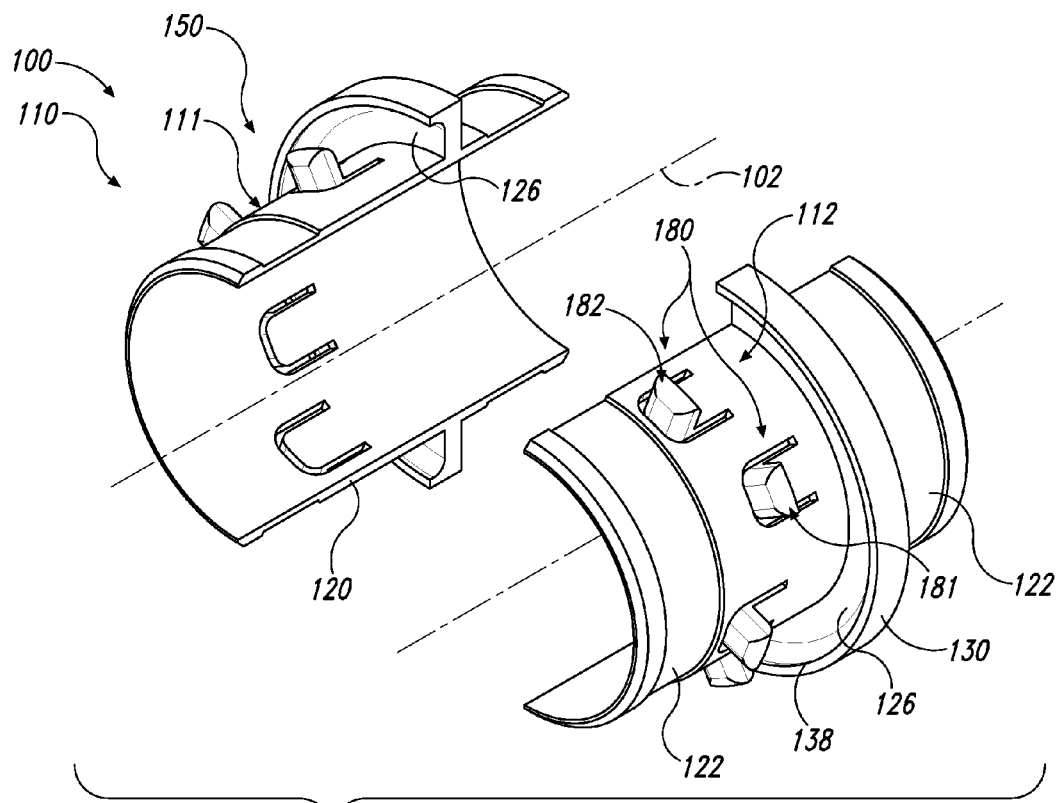
FIG. 9 is a less schematic exploded view of a grommet according to the present disclosure.
Figure 10:
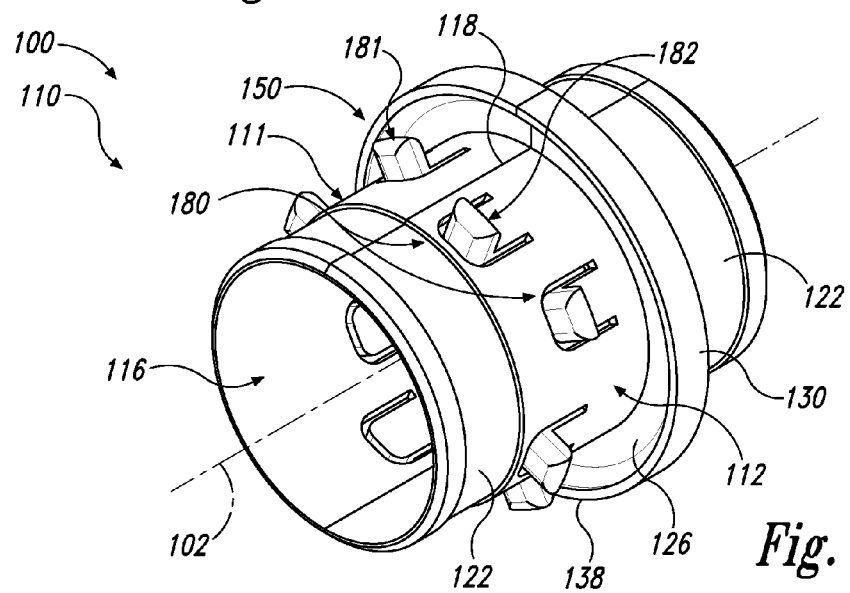
FIG. 10 is an assembled view of the grommet of FIG. 9.

As illustrated in dashed lines in FIG. 1 and illustrated in more detail in FIGS. 2-4 and 9-10, grommet body 110 may include, be defined by, and/or be formed from a first body portion 111 and a second body portion 112. First body portion 111 and second body portion 112 together may define tubular receiving region 116 and may be operatively attached to one another to form and/or define grommet body 110. First body portion 111 and second body portion 112 may form and/or define opposed halves of grommet body 110 and/or may be (at least substantially) mirror images of one another, although this is not required. As illustrated in FIGS. 3-4 and 10, a contact region 118 between first body portion 111 and second body portion 112 may extend (at least substantially) longitudinally along the grommet body and/or may be (at least substantially) parallel to a longitudinal axis 102 of the grommet body. Such a construction for grommet body 110 may permit grommet 100 to be installed on an existing harness 40 that already has been extended through and/or located within aperture 34 (as illustrated in FIG. 1), and first body portion 111 and second body portion 112 may be sized to permit and/or facilitate such an installation. Additionally or alternatively, such as construction for grommet body 110 may permit grommet 100 to be installed on harness 40 without a need to extend a terminal end of harness 40 through tubular receiving region 116.

As illustrated in dashed lines in FIG. 1 and in solid lines in FIGS. 2 and 9, grommet body 110, such as first body portion 111 and/or second body portion 112 thereof, further may include and/or define a body portion locating structure 120 that may be adapted, configured, designed, and/or constructed to operatively locate first body portion 111 and second body portion 112 relative to one another. Body portion locating structure 120 may include any suitable structure that may be configured to locate (or index) first body portion 111 and second body portion 112 relative to one another. As an example, body portion locating structure 120 may include a pin and a hole that is sized to receive the pin. Under these conditions, one of first body portion 111 and second body portion 112 may define the pin and the other of first body portion 111 and second body portion 112 may define the hole. As another example, body portion locating structure 120 may include a tongue and a groove that is sized to receive the tongue. Under these conditions, one of first body portion 111 and second body portion 112 may define the tongue and the other of first body portion 111 and second body portion 112 may define the groove.

As also illustrated in dashed lines in FIG. 1 and in more detail in FIGS. 2-7 and 9-13, grommet body 110, such as first body portion 111 and/or second body portion 112 thereof, may include and/or define a body recess 122 that may be sized to receive a body band 124 (as illustrated in FIG. 1). Body band 124 may be adapted, configured, sized, and/or selected to extend around first body portion 111 and also around second body portion 112 and/or to operatively attach first body portion 111 to second body portion 112. Body band 124 may include and/or be any suitable structure, such as a termination band, a shielded termination band, a metallic band, an elastomeric band, and/or a polymeric band.

Figure 12:
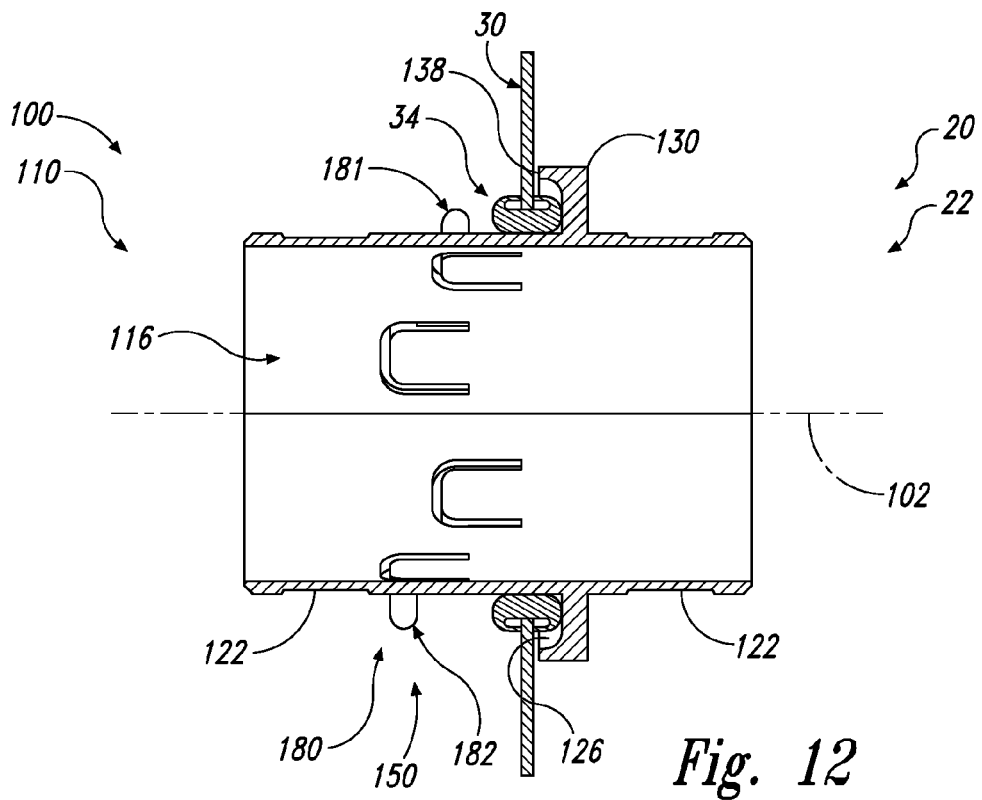
FIG. 12 is a cross-sectional view of the grommet of FIG. 9 taken along line 12-12 of FIG. 11.

As further illustrated in dashed lines in FIG. 1 and in more detail in FIGS. 9-10 and 12, grommet body 110 also may include and/or define a body adhesive groove 126 that may be located and/or sized to receive a body adhesive 128 (as illustrated in FIG. 1). Body adhesive 128 may be located, selected, and/or configured to operatively adhere grommet 100 and/or grommet body 110 thereof to structural component 30. As such, and as illustrated, body adhesive groove 126 may face toward structural component 30 when grommet 100 is received within aperture 34. Additionally or alternatively, body adhesive groove 126 may face (generally and/or at least substantially) in a direction that is parallel to longitudinal axis 102 of grommet body 110. Such a configuration may align body adhesive 128 with structural component 30, may permit contact between body adhesive 128 and structural component 30, and/or may permit body adhesive 128 to operatively adhere grommet body 110 to structural component 30.

Returning to FIG. 1, resilient cushion 140 may include any suitable structure that may be adapted, configured, designed, selected, sized, shaped, and/or constructed to extend between harness 40 and grommet body 110 and to retain harness 40 at the desired cross-sectional location within tubular receiving region 116. As an example, resilient cushion 140 may extend across and/or in contact with at least a portion, or even all, of tubular inner surface 116 of grommet body 110. As another example, resilient cushion 140 may extend across and/or in contact with at least a portion, or even all, of encircled portion 48 of harness 40.

Resilient cushion 140 may be shaped and/or configured to retain harness 40 at the desired cross-sectional location within tubular receiving region 116 and/or to resist motion of harness 40 from the desired cross-sectional location. Examples of shapes for resilient cushion 140 include any suitable hollow cylindrical shape, tubular shape, and/or hollow tubular shape.

Resilient cushion 140 may be selected and/or configured to be located within tubular receiving region 116 as a solid; and it is within the *scope* of the present disclosure that resilient cushion 140 may include and/or be a sheet of resilient material that may be deformed, extended, and/or wrapped around encircled portion 48 of harness 40. Additionally or alternatively, resilient cushion 140 also may include and/or be a molded resilient cushion 140 that includes at least one longitudinal slit 142. Either of these configurations may permit resilient cushion to be located and/or installed on harness 40 and/or within aperture 34 subsequent to harness 40 being extended through aperture 34 and/or without a need to translate resilient cushion 140 along a length of harness 40 to install resilient cushion 140 in contact with encircled portion 48 of harness 40.

It is within the scope of the present disclosure that the desired cross-sectional location within tubular receiving region 116 may include and/or be any suitable cross-sectional location. As an example, resilient cushion 140 may be sized to center harness 40 within a transverse cross-section of tubular receiving region 116. As another example, the desired cross-sectional location may include and/or be a central (or centered) portion of tubular receiving region 116.

Resilient cushion 140 may include and/or be formed from any suitable material. As examples, resilient cushion 140 may include a resilient material, an elastomeric material, and/or a flexible material. As more specific examples, resilient cushion 140 may include and/or be a polymeric material, a silicone, and/or a fluorosilicone. Generally, resilient cushion 140 is formed separately from grommet body 110 and/or formed from a different material than a material of grommet body 110. As an example, resilient cushion 140 may be formed from a material that is more flexible than the material of grommet body 110, more resilient than the material of grommet body 110, and/or softer than the material of grommet body 110.

Retention mechanism 150 may include and/or be any suitable structure that may be adapted, configured, sized, and/or constructed to selectively retain grommet body 110 within aperture 34 of structural component 30. As an example, and as discussed in more detail herein with reference to FIGS. 2-6 and 8, retention mechanism 150 may include and/or be a flange 160 that may be configured to be threaded onto grommet body 110. As another example, and as discussed in more detail herein with reference to FIGS. 9-13, retention mechanism 150 additionally or alternatively may include and/or be a plurality of resilient tabs 180 that may extend from grommet body 110.

Regardless of the exact configuration, retention mechanism 150 may be configured to operatively retain grommet 100 and/or grommet body 110 thereof within apertures 34 that have and/or define a variety of different aperture depths 36. As an example, retention mechanism 150 may be configured to retain grommet body 110 within apertures 34 that have an aperture depth 36 that is within a predetermined aperture depth range. As another example, retention mechanism 150 additionally or alternatively may be configured to retain grommet body 110 within a variety of different apertures 34 with respective aperture depths 36 that vary by at least the predetermined aperture depth range.

The predetermined aperture depth range may include any suitable range of aperture depths 36. As examples, aperture depths 36 may be at least 0.1 cm, at least 0.2 cm, at least 0.3 cm, at least 0.4 cm, at least 0.5 cm, at least 0.6 cm, at least 0.7 cm, at least 0.8 cm, at least 0.9 cm, and/or at least 1 cm. Additionally or alternatively, aperture depths 36 may be less than 3 cm, less than 2.75 cm, less than 2.5 cm, less than 2.25 cm, less than 2 cm, less than 1.75 cm, less than 1.5 cm, less than 1.25 cm, less than 1 cm, less than 0.9 cm, less than 0.8 cm, less than 0.7 cm, less than 0.6 cm, less than 0.5 cm, less than 0.4 cm, less than 0.3 cm, and/or less than 0.2 cm. The predetermined aperture depth range may be between any two of the above lower and upper aperture depth 36 values.

Retention mechanism 150 may be adapted, configured, designed, and/or constructed to retain grommet body 110 at a desired cross-sectional location within aperture 34. As an example, the desired cross-sectional location within aperture 34 may include and/or be a central portion of aperture 34. As another example, retention mechanism 150 may be configured to (at least substantially) center grommet body 110 within aperture 34 and/or within a transverse cross section of aperture 34.

As illustrated schematically in dashed lines in FIG. 1 and in more detail in FIGS. 2-7 and 9-12, grommet 100 and/or grommet body 110 thereof may include and/or define one or more body stops 130. Body stop 130 may extend from grommet body 110, such as in a direction that may be (at least substantially) perpendicular to longitudinal axis 102 of grommet body 110. Body stop 130 may be configured to operatively contact structural component 30 and/or structural component 30 may be operatively compressed between body stop 130 and retention mechanism 150 when grommet 100 is received and retained within aperture 34.

Body stop 130 may define a stop-component contacting surface 138 (as illustrated schematically in FIG. 1 and in more detail in FIGS. 9-12) that may be located, sized, and/or configured to contact structural component 30 when grommet 100 is received and retained within aperture 34. As an example, stop-component contacting surface 138 may extend (at least substantially) parallel to a portion of structural component 30 that is contacted thereby. As illustrated schematically in FIG. 1 and in more detail in FIGS. 9-10, body stop 130 may include and/or define body adhesive groove 126, although this is not required.

It is within the scope of the present disclosure that grommet 100 and/or grommet body 110 thereof may include and/or define a plurality of body stops 130 that may be spaced apart around a circumference thereof, such as is illustrated in FIGS. 2-7. As examples, grommet 100 may include at least 2, at least 3, or at least 4 body stops 130. Additionally or alternatively, it is within the scope of the present disclosure that (a single) body stop 130 may extend circumferentially around, around a majority of, or even around an entire outer perimeter of grommet body 110, such as is illustrated in FIGS. 9-12.

Figure 5:
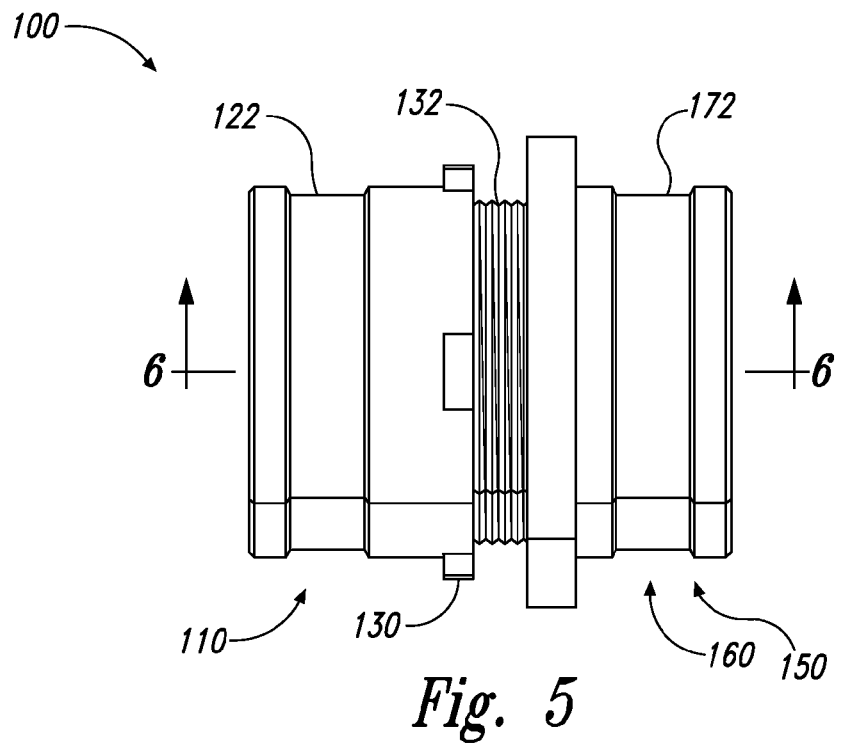
FIG. 5 is a side view of the grommet of FIG. 2.
Figure 6:
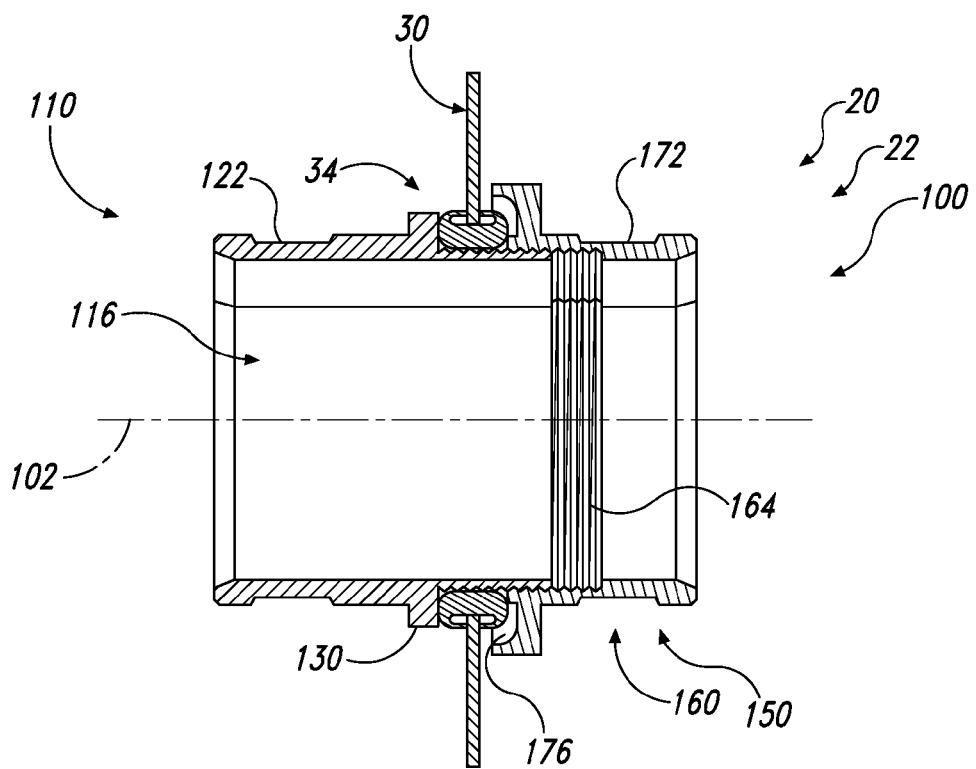
FIG. 6 is a cross-sectional view of the grommet of FIG. 2 taken along line 6-6 of FIG. 5.
Figure 7:
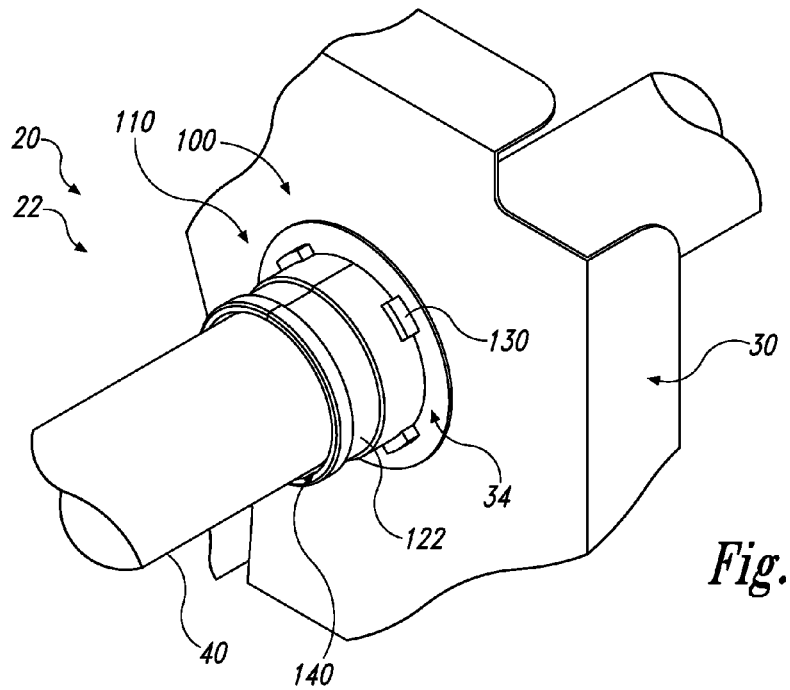
FIG. 7 is an example of the grommet of FIG. 2 extending through an aperture that is defined by a structural component.
Figure 8:
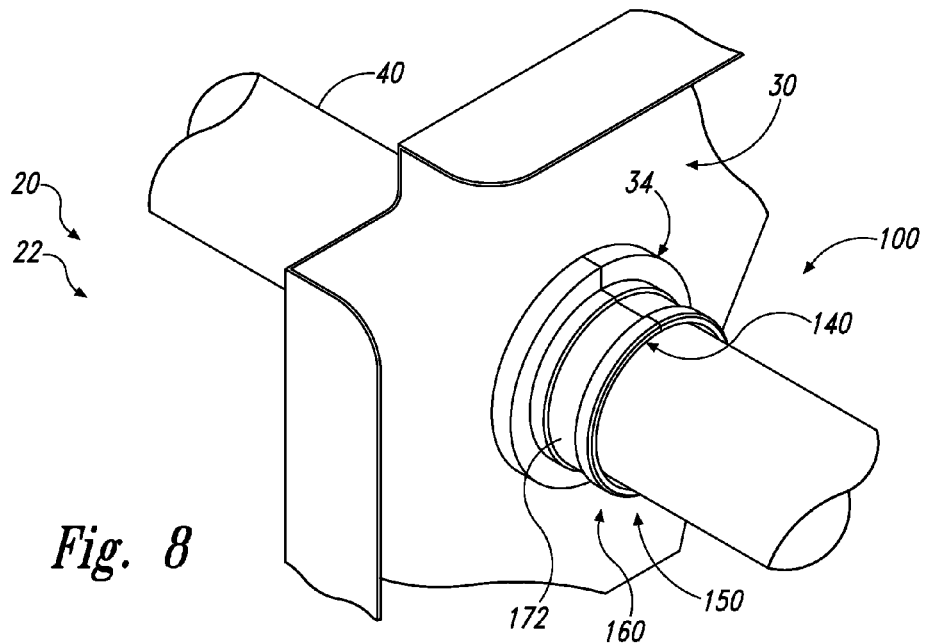
FIG. 8 is another example of the grommet of FIG. 2 extending through an aperture.

FIGS. 2-8 provide less schematic views of a grommet 100 according to the present disclosure that includes a retention mechanism 150 in the form of a flange 160. FIG. 2 is an exploded view of grommet 100. FIG. 3 is a partially assembled view of grommet 100 of FIG. 2. FIG. 4 is an assembled view of grommet 100 of FIG. 2. FIG. 5 is a side view of grommet 100 of FIG. 2. FIG. 6 is a cross-sectional view of grommet 100 of FIG. 2 taken along line 6-6 of FIG. 5 and extending through an aperture 34 that is defined by structural component 30. FIG. 7 is an example of grommet 100 of FIG. 2 extending through aperture 34. FIG. 8 is another example of grommet 100 of FIG. 2 extending through an opposed side of aperture 34. Grommets 100 of FIGS. 2-8 may include and/or be more detailed representations of grommets 100 of FIG. 1, and any of the structures, functions, components, and/or features that are discussed herein with reference to grommets 100 of any of FIGS. 2-8 may be included in and/or utilized with grommets 100 of FIG. 1 without departing from the scope of the present disclosure. Similarly, any of the structures, functions, components, and/or features that are discussed herein with reference to grommets 100 of FIG. 1 may be included in and/or utilized with grommets 100 of FIGS. 2-8 without departing from the scope of the present disclosure.

As illustrated at least in FIGS. 1-5, grommet bodies 110 of grommets 100 of FIGS. 2-8 include a first threaded region 132. Similarly, and as illustrated in FIGS. 1-3 and 6, flange 160 includes a second threaded region 164. First threaded region 132 and second threaded region 164 may be adapted, configured, designed, shaped, and/or sized to operatively interlock with one another, such as to permit flange 160 to be threaded onto grommet body 110 and/or to operatively interlock flange 160 to grommet body 110. Additionally or alternatively, flange 160 may be configured to be threaded onto grommet body 110 subsequent to grommet body 110 being located within aperture 34, as illustrated in FIGS. 1 and 6-8. This may retain grommet body 110 within aperture 34 and/or may compress structural component 30 between flange 160 and body stop 130.

As illustrated in FIGS. 1-4, flange 160 may include a first flange portion 161 and a second flange portion 162. First flange portion 161 and second flange portion 162 may be adapted, configured, designed, sized, and/or constructed to be operatively attached to one another to form flange 160 in a manner that may be at least substantially similar to the manner in which first body portion 111 and second body portion 112 may be operatively attached to one another to form grommet body 110. As an example, first flange portion 161 and second flange portion 162 may form and/or define opposed halves of flange 160 and/or may be (at least substantially) mirror images of one another, although this is not required. As illustrated in FIGS. 3-4, a contact region 168 between first flange portion 161 and second flange portion 162 may extend (at least substantially) longitudinally along flange 160 and/or may be at least substantially parallel to longitudinal axis 102 of grommet body 110 when flange 160 is threaded onto grommet body 110. In addition, second threaded portion 164 may be defined by both first flange portion 161 and second flange portion 162.

Thus, and similar to grommet body 110, flange 160 may be located around harnesses 40 that already extend through apertures 34. As examples, flange 160 may be located around harness 40 subsequent to harness 40 being extended through aperture 34 and/or may be located around harness 40 without a need to translate flange 160 along the length of harness 40 to thread flange 160 onto grommet body 110 and/or to operatively retain grommet body 110 within aperture 34.

As illustrated in dashed lines in FIG. 1 and in solid lines in FIG. 2, flange 160, such as first flange portion 161 and/or second flange portion 162 thereof, further may include and/or define a flange portion locating structure 170 that may be adapted, configured, designed, and/or constructed to operatively locate first flange portion 161 and second flange portion 162 relative to one another. Flange portion locating structure 170 may include any suitable structure that may be configured to locate (or index) first flange portion 161 and second flange portion 162 relative to one another. As an example, flange portion locating structure 170 may include a pin and a hole that is sized to receive the pin. Under these conditions, one of first flange portion 161 and second flange portion 162 may define the pin and the other of first flange portion 161 and second flange portion 162 may define the hole. As another example, flange portion locating structure 170 may include a tongue and a groove that is sized to receive the tongue. Under these conditions, one of first flange portion 161 and second flange portion 162 may define the tongue and the other of first flange portion 161 and second flange portion 162 may define the groove.

As also illustrated in dashed lines in FIG. 1 and in more detail in FIGS. 2-6 and 8, flange 160, such as first flange portion 161 and/or second flange portion 162 thereof, may include and/or define a flange recess 172 that may be sized to receive a flange band 174 (as illustrated in FIG. 1). Flange band 174 may be adapted, configured, sized, and/or selected to extend around first flange portion 161 and also around second flange portion 162 and to operatively attach first flange portion 161 to second flange portion 162. Flange band 174 may include and/or be any suitable structure, examples of which are discussed herein with reference to body band 124.

As also illustrated in dashed lines in FIG. 1 and in more detail in FIGS. 2-4 and 6, flange 160 may include and/or define a flange adhesive groove 176 that may be located and/or sized to receive a flange adhesive 178 (as illustrated in FIG. 1). Flange adhesive 178 may be located, selected, and/or configured to operatively adhere flange 160 to structural component 30. As such, and as illustrated in FIG. 6, flange adhesive groove 176 may face toward structural component 30 when grommet 100 is received within aperture 34 and retained therein with flange 160. Additionally or alternatively, flange adhesive groove 176 may face (generally and/or at least substantially) in a direction that is parallel to longitudinal axis 102 of grommet body 110. Such a configuration may align flange adhesive 178 with structural component 30, may permit contact between flange adhesive 178 and structural component 30, and/or may permit flange adhesive 178 to operatively adhere flange 160 to structural component 30.

Figure 11:
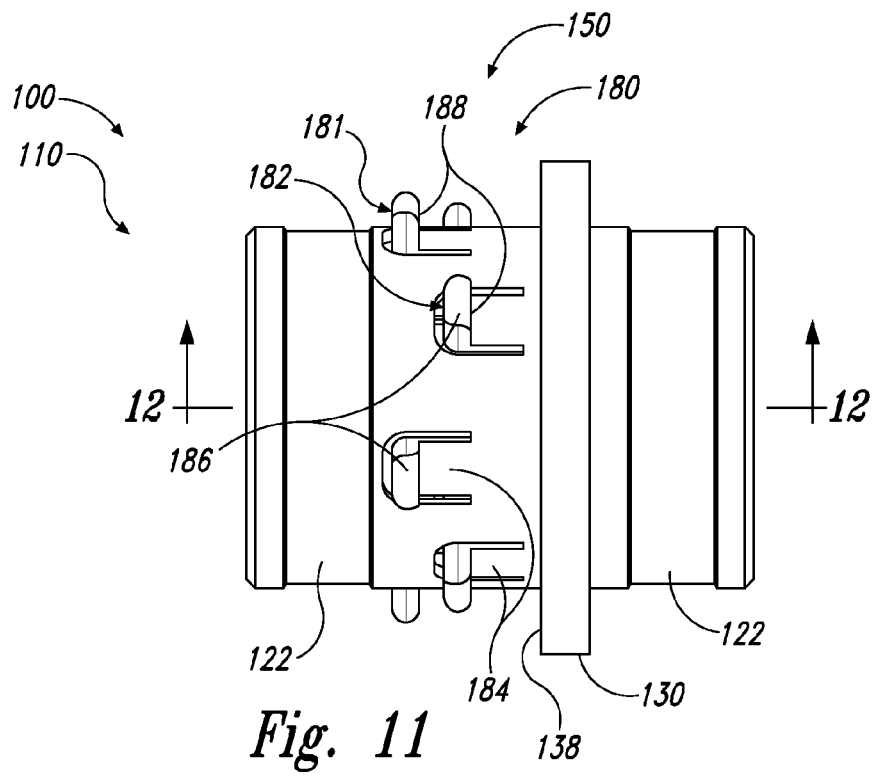
FIG. 11 is a side view of the grommet of FIG. 9.
Figure 13:
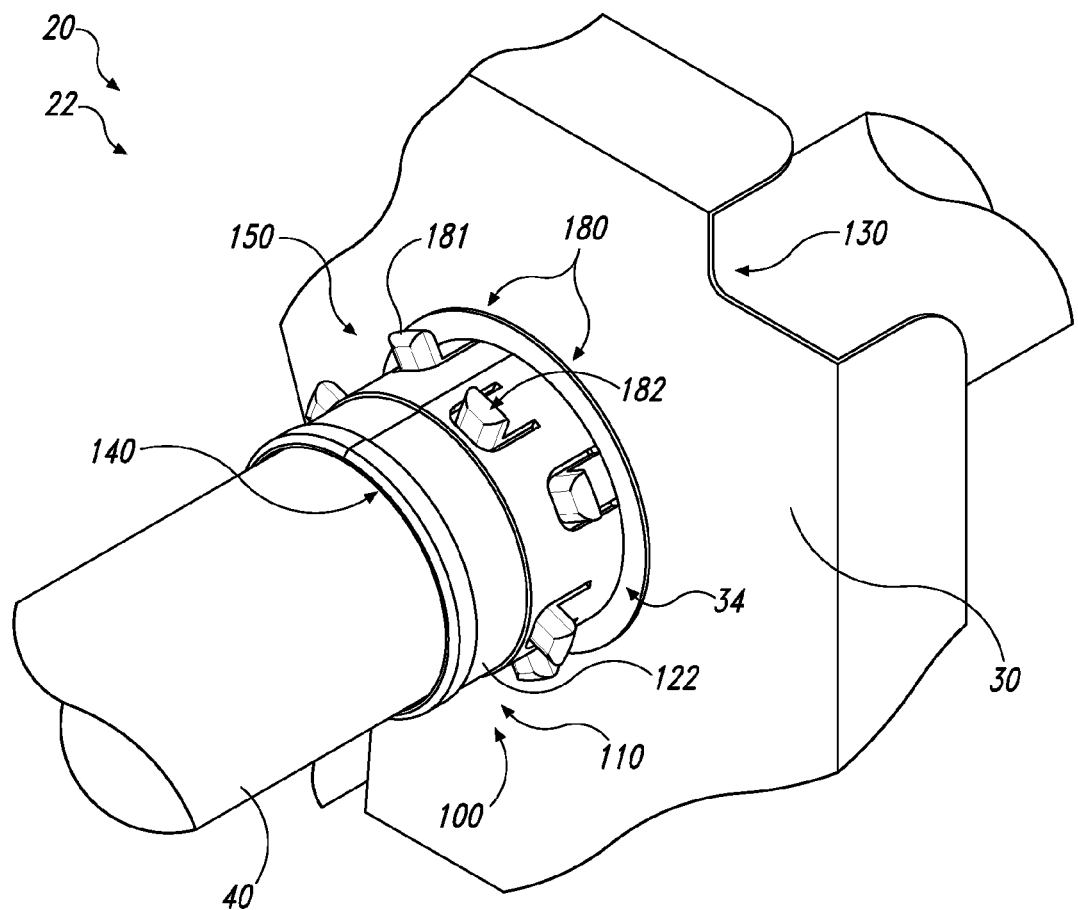
FIG. 13 is an example of the grommet of FIG. 2 extending through an aperture that is defined by a structural component.

FIGS. 9-13 provide less schematic views of a grommet 100 according to the present disclosure that includes a retention mechanism 150 in the form of a plurality of resilient tabs 180. FIG. 9 is an exploded view of grommet 100. FIG. 10 is an assembled view of grommet 100 of FIG. 9. FIG. 11 is a side view of grommet 100 of FIG. 9. FIG. 12 is a cross-sectional view of grommet 100 of FIG. 9 taken along line 12-12 of FIG. 11 and extending through an aperture 34 that is defined by a structural component 30. FIG. 13 is an example of grommet 100 of FIG. 2 extending through aperture 34.

The plurality of resilient tabs 180 may include at least first resilient tab 181 and a second resilient tab 182. First resilient tab 181 and second resilient tab 182 may be spaced apart from body stop 130 along the longitudinal length of grommet body 110. In addition, a first distance 191 (as illustrated in FIG. 1) between first resilient tab 181 and body stop 130 may be different from (or less than) a second distance 192 (as illustrated in FIG. 1) between second resilient tab 182 and body stop 130.

As discussed, retention mechanisms 150 may be configured to retain grommet 100 and/or grommet body 110 thereof within apertures 34 that have a variety of different aperture depths 36 (as illustrated in FIG. 1). With this in mind, first distance 191 may be selected to operatively retain structural component 30 between first resilient tab 181 and body stop 130 when grommet 100 is located within an aperture 34 that has a first aperture depth 36. Similarly, second distance 192 may be selected to operatively retain structural component 30 between second resilient tab 182 and body stop 130 when grommet 100 is located within an aperture 34 that has a second aperture depth 36 that is different from the first aperture depth. It is within the scope of the present disclosure that retention mechanism 150 may include any suitable number of resilient tabs 180 that may be spaced apart from body stop 130 by any suitable respective distance. As such, retention mechanism 150 may be configured to retain grommet 100 and/or grommet body 110 thereof in a variety of apertures 34 that have a variety of different aperture depths 36.

Resilient tabs 180 may be configured to flex, bend, and/or deform to permit grommet 100 to be inserted into aperture 34. As an example, and as illustrated in FIGS. 1 and 11, resilient tabs 180 may include and/or define a deformation region 184. Deformation region 184 may be configured to be deformed to permit grommet 100 and/or grommet body 110 thereof to be inserted into aperture 34. Deformation region 184 may extend (at least substantially) parallel to longitudinal axis 102 of grommet body 110.

Resilient tabs 180 also may include and/or define a projecting portion 186, as also illustrated in FIGS. 1 and 11. Projecting portion 186 may be configured to operatively engage structural component 30 when grommet 100 is received within aperture 34, such as to retain grommet 100 within aperture 34. Projecting portion 186 may extend (at least substantially) perpendicular to longitudinal axis 102 of grommet body 110. As an example, projecting portion 186 may define a portion-component contacting surface 188 (as illustrated in FIGS. 1 and 11). Portion-component contacting surface 188 may be configured to contact structural component 30 when grommet 100 is received within aperture 34. As such, portion-component contacting surface 188 may extend (at least substantially) parallel to a portion of structural component 30 that is contacted thereby and/or may extend (at least substantially) perpendicular to longitudinal axis 102 of grommet body 110.

It is within the scope of the present disclosure that resilient tabs 180 may be operatively attached to grommet body 110. Additionally or alternatively, resilient tabs 180 also may be defined by grommet body 110. As an example, grommet body 110 may include and/or be a molded and/or machined structure that defines resilient tabs 180. Under these conditions, retention mechanism 150 may be defined by grommet body 110.

Figure 14:
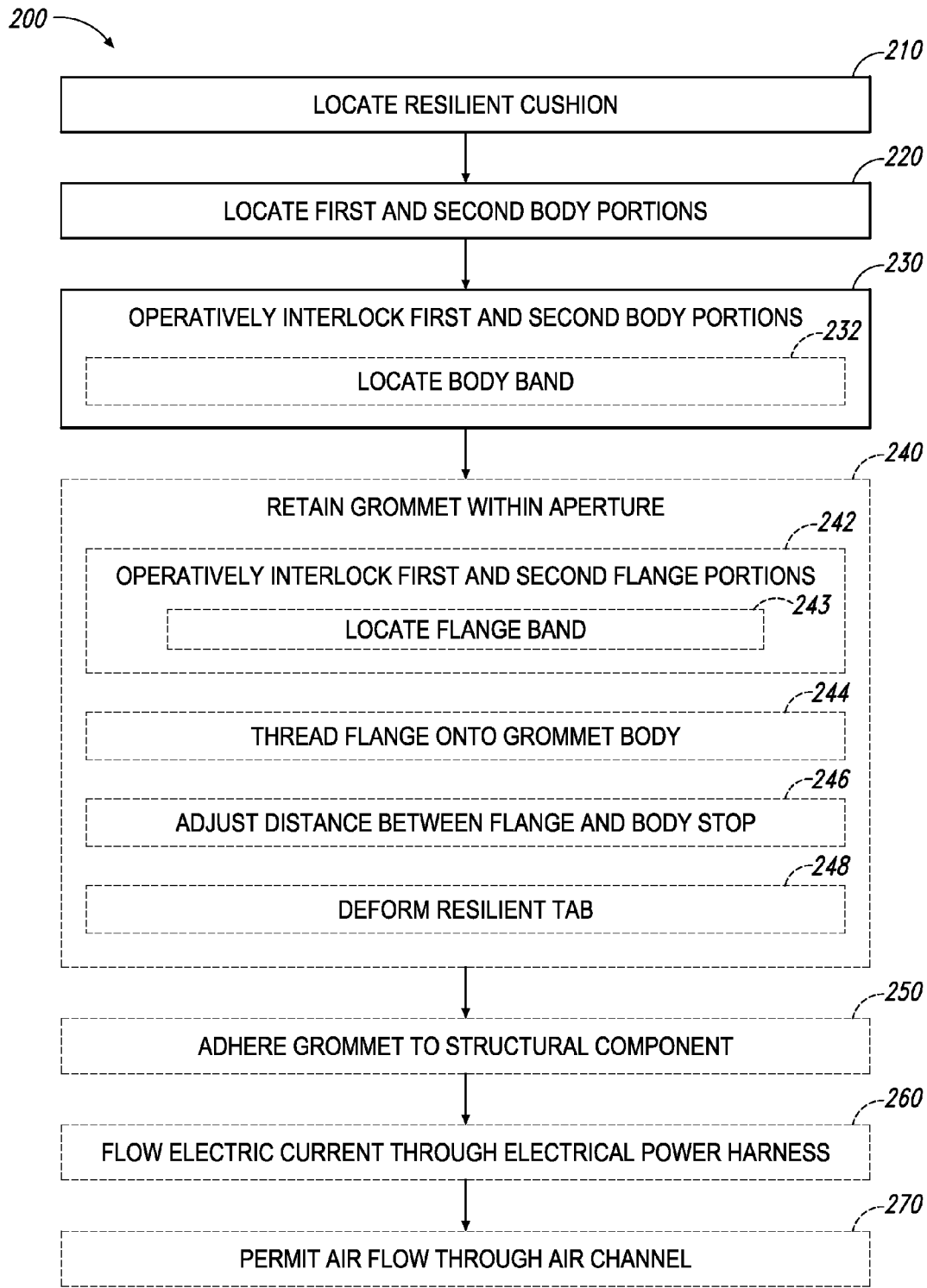
FIG. 14 is a flowchart depicting methods, according to the present disclosure, of installing a grommet.

FIG. 14 is a flowchart depicting methods 200, according to the present disclosure, of installing a grommet in an aperture that is defined by a structural component and through which a harness extends (or will extend). Methods 200 include locating a resilient cushion around an external surface of the harness at 210, locating first and second body portions of the grommet around an external surface of the resilient cushion at 220, and operatively interlocking the first and second body portions at 230. Methods 200 further may include retaining the grommet within the aperture at 240, adhering the grommet to the structural component at 250, flowing an electric current through the harness at 260, and/or permitting an air flow through an air channel of the harness at 270.

Locating the resilient cushion around the external surface of the harness at 210 may include locating the resilient cushion in any suitable manner. As an example, the locating at 210 may include wrapping and/or extending the resilient cushion around the external surface of the harness. As another example, the locating at 210 may include locating the resilient cushion as a solid, such as by locating a pre-formed and/or pre-defined resilient cushion. Examples of the resilient cushion are discussed herein with reference to resilient cushion 140.

It is within the scope of the present disclosure that the locating at 210 may not include (or may not be required to include) sliding the harness through a tubular region that may be defined by the resilient cushion and/or may not include (or be required to include) translating the resilient cushion along a longitudinal length of the harness. The locating at 210 may be performed with any suitable sequence within methods 200. As an example, the locating at 210 may be performed prior to the locating at 220. As another example, the locating at 210 may be concurrent with the locating at 220, such as when the resilient cushion is operatively affixed to the first and second body portions prior to the locating at 210 and/or prior to the locating at 220. As yet another example, the locating at 210 may be performed subsequent to the harness being extended through the aperture, and methods 200 also may include extending the harness through the aperture.

Locating the first and second body portions around the external surface of the resilient cushion at 220 may include locating the first body portion and the second body portion in any suitable manner. As an example, the locating at 220 may include extending the first body portion and the second body portion around the external surface of the resilient cushion. As another example, the locating at 220 may include locating without (or without requiring) the harness and/or the resilient cushion to slide and/or translate through a tubular receiving region that may be defined by the first and second body portions and/or without translating the first and second body portions (or requiring the first and second body portions to be translated) along the longitudinal length of the harness. As yet another example, the locating at 220 may be performed subsequent to extending the harness through the aperture.

Operatively interlocking the first and second body portions at 230 may include operatively interlocking the first body portion and the second body portion to form a grommet body. Examples of the first body portion are discussed herein with reference to first body portion 111. Examples of the second body portion are discussed herein with reference to second body portion 112. Examples of the grommet body are discussed herein with reference to grommet body 110. The operatively interlocking at 230 may include defining the tubular receiving region with the grommet body such that the harness and the resilient cushion extend within the tubular receiving region. The operatively interlocking at 230 may include utilizing a body portion locating structure, such as body portion locating structure 120, which is discussed herein, to operatively locate the first body portion and the second body portion relative to one another. The operatively interlocking at 230 also may include locating a body band at 232 within a body recess that is defined by the first body portion and by the second body portion. Examples of the body band are discussed herein with reference to body band 124. Examples of the body recess are discussed herein with reference to body recess 122.

Retaining the grommet within the aperture at 240 may include retaining the grommet with a retention mechanism and may be accomplished in any suitable manner. As an example, the retaining at 240 may include threading, at 244, a flange onto the grommet body to compress the structural component between the flange and a body stop that extends from the grommet body. Under these conditions, the retaining at 240 also may include adjusting, at 246, a distance between the flange and the body stop, via the threading at 244. This may include adjusting to contact both the body stop and the flange with the structural component. When methods 200 include the threading at 244, methods 200 also may include operatively interlocking a first flange portion with a second flange portion to define the flange, as indicated at 242. The operatively interlocking at 242 may be performed prior to the threading at 244 and may include locating a flange band within a flange recess that is defined by the first flange portion and by the second flange portion, as indicated at 243.

As another example, the retaining at 240 also may include deforming a resilient tab, as indicated at 248, to extend the grommet body (or to permit the grommet body to be extended) through the aperture and/or to locate the structural component between the resilient tab and the body stop. Examples of the retention mechanism and/or components thereof are discussed herein with reference to retention mechanism 150, flange 160, first flange portion 161, second flange portion 162, flange recess 172, flange band 174, and/or resilient tabs 180.

Adhering the grommet to the structural component at 250 may include adhering the grommet to the structural component in any suitable manner. As an example, the adhering at 250 may include adhering with a body adhesive that extends within a body adhesive groove that is defined by the grommet body. As another example, the adhering at 250 also may include adhering with a flange adhesive that extends within a flange adhesive groove that is defined by the flange, when present. As additional examples, the adhering at 250 may include adhering without adhering the grommet to the harness, without locating an adhesive within the tubular receiving region, and/or without occluding and/or blocking (any of) the air channels of the harness. Examples of the body adhesive, the body adhesive groove, the flange adhesive, and/or the flange adhesive groove are discussed herein with reference to body adhesive 128, body adhesive groove 126, flange adhesive 178, and/or flange adhesive groove 176, respectively.

Flowing the electric current through the harness at 260 may include flowing the electric current through the harness in any suitable manner. As an example, the harness may include and/or be an electrical power harness that includes a plurality of wires. Under these conditions, the flowing at 260 may include flowing the electric current through one or more of the plurality of wires. Examples of the harness, the electrical power harness, and/or the wires are discussed herein with reference to harness 40, electrical power harness 42, and/or wires 46, respectively.

Permitting the air flow through the air channel of the harness at 270 may include permitting the air flow through one or more air channels that may be internal to, within, and/or defined by the harness. The permitting at 270 may be at least partially concurrent with the flowing at 260. As discussed, and in contrast with conventional harness retention mechanisms, the systems and methods disclosed herein may not block and/or occlude the air channels that may be present within the harness. Thus, the permitting at 270 may decrease a potential for heating of the harness and/or for hot spots within the harness. Examples of the air channels are discussed herein with reference to air channels 44.

Illustrative, non-exclusive examples of inventive subject matter according to the present disclosure are described in the following enumerated paragraphs:

A1. A grommet for supporting a harness within an aperture that is defined by a structural component, the grommet comprising:

a grommet body configured to be received within the aperture and to extend between the harness and the structural component when the harness and the grommet body are received within the aperture, wherein the grommet body defines a tubular receiving region sized to receive the harness such that the grommet body encircles at least an encircled portion of the harness;

optionally, a resilient cushion located within the tubular receiving region and configured to extend between the harness and the grommet body when the harness is received within the tubular receiving region, optionally wherein the resilient cushion is shaped to retain the harness at a desired cross-sectional location within the tubular receiving region, and further optionally wherein the resilient cushion is formed from a different material than a material of the grommet body; and a retention mechanism configured to selectively retain the grommet body within the aperture.

A2. The grommet of paragraph A1, wherein the grommet body has a tubular inner surface that defines the tubular receiving region, and further wherein the resilient cushion extends across (or in contact with) at least a portion, and optionally all, of the tubular inner surface.

A3. The grommet of any of paragraphs A1-A2, wherein the resilient cushion extends across (or in contact with) at least a portion, and optionally all, of the encircled portion of the harness.

A4. The grommet of any of paragraphs A1-A3, wherein a shape of the resilient cushion is configured such that the harness is retained at the desired cross-sectional location within the tubular receiving region.

A5. The grommet of any of paragraphs A1-A4, wherein the resilient cushion is configured to resist motion of the harness from the desired cross-sectional location within the tubular receiving region.

A6. The grommet of any of paragraphs A1-A5, wherein the resilient cushion is sized to center the harness within a transverse cross-section of the tubular receiving region.

A7. The grommet of any of paragraphs A1-A6, wherein the desired cross-sectional location within the tubular receiving region includes a central portion of the tubular receiving region.

A8. The grommet of any of paragraphs A1-A7, wherein the resilient cushion is formed from at least one of a resilient material, an elastomeric material, and a flexible material.

A9. The grommet of any of paragraphs A1-A8, wherein the resilient cushion is formed from at least one of a polymeric material, a silicone, and a fluorosilicone.

A10. The grommet of any of paragraphs A1-A9, wherein the resilient cushion is configured to be located within the tubular receiving region as a solid.

A11. The grommet of any of paragraphs A1-A10, wherein the grommet body includes a first body portion and a second body portion that together define the tubular receiving region.

A12. The grommet of paragraph A11, wherein the first body portion and the second body portion are operatively attached to one another to form the grommet body.

A13. The grommet of any of paragraphs A11-A12, wherein the first body portion and the second body portion are (at least substantially) mirror images of one another.

A14. The grommet of any of paragraphs A11-A13, wherein the first body portion and the second body portion define opposed halves of the grommet body.

A15. The grommet of any of paragraphs A11-A14, wherein a contact region between the first body portion and the second body portion extends longitudinally along the grommet body.

A16. The grommet of any of paragraphs A11-A15, wherein the grommet body further includes a body portion locating structure configured to operatively locate the first body portion and the second body portion relative to one another.

A17. The grommet of paragraph A16, wherein the body portion locating structure includes at least one of (i) a pin and a hole sized to receive the pin and (ii) a tongue and a groove sized to receive the tongue.

A18. The grommet of any of paragraphs A11-A17, wherein the first body portion and the second body portion are sized to permit installation of the grommet onto an existing harness that already extends through the aperture.

A19. The grommet of any of paragraphs A11-A18, wherein the grommet body includes a body recess sized to receive a body band that is configured to extend around the first body portion and the second body portion to operatively attach the first body portion to the second body portion.

A20. The grommet of paragraph A19, wherein the grommet includes the body band, and further wherein the body band is located within the body recess, extends around the first body portion and the second body portion, and operatively attaches the first body portion to the second body portion.

A21. The grommet of any of paragraphs A1-A20, wherein the grommet body is sized to support the harness within the aperture when an inner diameter of the aperture is at least one of:

(i) at least 1 cm, at least 1.5 cm, at least 2 cm, at least 2.5 cm, at least 3 cm, at least 3.5 cm, at least 4 cm, at least 4.5 cm, or at least 5 cm; and (ii) less than 7.5 cm, less than 7 cm, less than 6.5 cm, less than 6 cm, less than 5.5 cm, less than 5 cm, less than 4.5 cm, less than 4 cm, less than 3.5 cm, less than 3 cm, or less than 2.5 cm.

A22. The grommet of any of paragraphs A1-A21, wherein the grommet body is formed from at least one of a polymeric material, a resin, an amorphous thermoplastic, and an amorphous thermoplastic polyetherimide resin.

A23. The grommet of any of paragraphs A1-A22, wherein the grommet body further includes a body adhesive groove configured to receive a body adhesive.

A24. The grommet of paragraph A23, wherein the grommet further includes the body adhesive, and further wherein the body adhesive is configured to operatively adhere the grommet body to the structural component when the grommet is received within the aperture.

A25. The grommet of any of paragraphs A23-A24, wherein the body adhesive groove faces toward the structural component when the grommet is received within the aperture.

A26. The grommet of any of paragraphs A23-A25, wherein the body adhesive groove faces in a direction that is (at least substantially) parallel to a longitudinal axis of the grommet body.

A27. The grommet of any of paragraphs A1-A26, wherein the aperture defines an aperture depth, and further wherein the retention mechanism is at least one of (i) configured to retain the grommet body within the aperture when the aperture depth is within a predetermined aperture depth range and (ii) configured to retain the grommet body within a variety of apertures with respective aperture depths that vary by at least the predetermined aperture depth range.

A28. The grommet of paragraph A27, wherein the predetermined aperture depth range is between:

(i) at least 0.1 cm, at least 0.2 cm, at least 0.3 cm, at least 0.4 cm, at least 0.5 cm, at least 0.6 cm, at least 0.7 cm, at least 0.8 cm, at least 0.9 cm, or at least 1 cm; and (ii) less than 3 cm, less than 2.75 cm, less than 2.5 cm, less than 2.25 cm, less than 2 cm, less than 1.75 cm, less than 1.5 cm, less than 1.25 cm, less than 1 cm, less than 0.9 cm, less than 0.8 cm, less than 0.7 cm, less than 0.6 cm, less than 0.5 cm, less than 0.4 cm, less than 0.3 cm, or less than 0.2 cm.

A29. The grommet of any of paragraphs A1-A28, wherein the retention mechanism is configured to retain the grommet body at a desired cross-sectional location within the aperture.

A30. The grommet of paragraph A29, wherein the desired cross-sectional location within the aperture includes a central portion of the aperture A31. The grommet of any of paragraphs A1-A30, wherein the retention mechanism is configured to center the grommet body within (a transverse cross-section of) the aperture.

A32. The grommet of any of paragraphs A1-A31, wherein the grommet body includes a body stop, which extends from the grommet body, and a first threaded region, wherein the retention mechanism includes a flange that includes a second threaded region, wherein the first threaded region and the second threaded region are sized to operatively interlock to permit the flange to be threaded onto the grommet body.

A33. The grommet of paragraph A32, wherein the flange is configured to be threaded onto the grommet body to compress the structural component between the flange and the body stop when the grommet is located within the aperture.

A34. The grommet of any of paragraphs A32-A33, wherein the flange includes a first flange portion and a second flange portion.

A35. The grommet of paragraph A34, wherein the first flange portion and the second flange portion are operatively attached to one another to form the flange.

A36. The grommet of any of paragraphs A34-A35, wherein the first flange portion and the second flange portion are (at least substantially) mirror images of one another.

A37. The grommet of any of paragraphs A34-A36, wherein the first flange portion and the second flange portion define opposed halves of the flange.

A38. The grommet of any of paragraphs A34-A37, wherein the second threaded region is defined by the first flange portion and by the second flange portion.

A39. The grommet of any of paragraphs A34-A38, wherein a contact region between the first flange portion and the second flange portion extends longitudinally along the flange.

A40. The grommet of any of paragraphs A34-A39, wherein the flange further includes a flange portion locating structure configured to operatively locate the first flange portion and the second flange portion relative to one another.

A41. The grommet of paragraph A40, wherein the flange portion locating structure includes at least one of (i) a pin and a hole sized to receive the pin and (ii) a tongue and a groove sized to receive the tongue.

A42. The grommet of any of paragraphs A34-A41, wherein the first flange portion and the second flange portion are sized to permit installation of the grommet onto an/the existing harness that already extends through the aperture.

A43. The grommet of any of paragraphs A34-A42, wherein the flange includes a flange recess sized to receive a flange band, wherein the flange band extends around the first flange portion and the second flange portion to operatively attach the first flange portion to the second flange portion.

A44. The grommet of paragraph A43, wherein the grommet includes the flange band, and further wherein the flange band is located within the flange recess, extends around the first flange portion and the second flange portion, and operatively attaches the first flange portion to the second flange portion.

A45. The grommet of any of paragraphs A32-A44, wherein the flange further includes a flange adhesive groove configured to receive a flange adhesive.

A46. The grommet of paragraph A45, wherein the flange further includes the flange adhesive, and further wherein the flange adhesive is configured to operatively adhere the flange to the structural component when the grommet is received within the aperture.

A47. The grommet of any of paragraphs A45-A46, wherein the flange adhesive groove faces toward the structural component when the grommet is received within the aperture.

A48. The grommet of any of paragraphs A45-A47, wherein the flange adhesive groove faces in a/the direction that is (at least substantially) parallel to a/the longitudinal axis of the grommet body when the flange is threaded onto the grommet body.

A49. The grommet of any of paragraphs A1-A48, wherein the grommet body includes a/the body stop, which extends from the grommet body, and further wherein the retention mechanism includes a plurality of resilient tabs that extends from the grommet body.

A50. The grommet of paragraph A49, wherein the plurality of resilient tabs includes at least a first resilient tab and a second resilient tab, wherein the first resilient tab and the second resilient tab are spaced apart from the body stop along a longitudinal length of the grommet body, and further wherein a first distance between the first resilient tab and the body stop is different from a second distance between the second resilient tab and the body stop.

A51. The grommet of paragraph A50, wherein the first distance is selected to operatively retain the structural component between the first resilient tab and the body stop when the grommet is located within an aperture with a first aperture depth, wherein the second distance is selected to operatively retain the structural component between the second resilient tab and the body stop when the grommet is located within an aperture with a second aperture depth, and further wherein the first aperture depth is different from the second aperture depth.

A52. The grommet of any of paragraphs A49-A51, wherein the plurality of resilient tabs is configured to be deformed to permit the grommet to be inserted into the aperture.

A53. The grommet of any of paragraphs A49-A52, wherein each of the plurality of resilient tabs includes a deformation region, which is configured to be deformed to permit the grommet body to be inserted into the aperture, and a projecting portion, which is configured to operatively engage the structural component when the grommet is received within the aperture.

A54. The grommet of paragraph A53, wherein the deformation region extends (at least substantially) parallel to a/the longitudinal axis of the grommet body.

A55. The grommet of any of paragraphs A53-A54, wherein the projecting portion extends (at least substantially) perpendicular to a/the longitudinal axis of the grommet body.

A56. The grommet of any of paragraphs A53-A55, wherein the projecting portion defines a portion-component contacting surface that is configured to contact the structural component when the grommet is received within the aperture.

A57. The grommet of paragraph A56, wherein the portion-component contacting surface extends (at least substantially) parallel to a portion of the structural component that is contacted thereby.

A58. The grommet of any of paragraphs A53-A57, wherein the portion-component contacting surface extends (at least substantially) perpendicular to a/the longitudinal axis of the grommet body.

A59. The grommet of any of paragraphs A49-A58, wherein the plurality of resilient tabs is defined by the grommet body.

A60. The grommet of any of paragraphs A32-A59, wherein the body stop extends in a direction that is (at least substantially) perpendicular to a/the longitudinal axis of the grommet body.

A61. The grommet of any of paragraphs A32-A60, wherein the body stop defines a stop-component contacting surface that is configured to contact the structural component when the grommet is received within the aperture.

A62. The grommet of paragraph A61, wherein the stop-component contacting surface extends (at least substantially) parallel to a portion of the structural component that is contacted thereby.

A63. The grommet of any of paragraphs A32-A62, wherein the grommet body includes a plurality of body stops, optionally wherein the plurality of body stops includes at least 2, at least 3, or at least 4 body stops.

A64. The grommet of any of paragraphs A32-A63, wherein the body stop extends circumferentially around an (entire) outer perimeter of the grommet body.

A65. The grommet of any of paragraphs A1-A64, wherein a sealant material does not extend between the grommet body and the harness.

A66. The grommet of any of paragraphs A1-A65, wherein the grommet body is not adhered to the harness when the grommet body is received within the aperture and the harness extends through the tubular receiving region.

A67. The grommet of any of paragraphs A1-A66, wherein the harness includes an electrical power harness.

A68. The grommet of any of paragraphs A1-A67, wherein the harness includes an electrical power harness for an aircraft.

A69. The grommet of any of paragraphs A1-A68, wherein the structural component includes a frame member for an/the aircraft.

A70. An aircraft, comprising:
a harness;
a structural component that defines an aperture; and
the grommet of any of paragraphs A1-A69, wherein:
(i) the grommet body is received within the aperture and retained within the aperture with the retention mechanism; and
(ii) the harness extends through the tubular receiving region.

A71. The aircraft of paragraph A70, wherein the harness includes a plurality of air channels that extends between a first side of the tubular receiving region and a second side of the tubular receiving region.

B1. A method of installing a grommet in an aperture that is defined by a structural component, wherein a harness extends through the aperture, the method comprising:
locating a resilient cushion around an external surface of the harness;
locating a first body portion and a second body portion around an external surface of the resilient cushion; and
operatively interlocking the first body portion with the second body portion to form a grommet body, wherein the operatively interlocking includes defining a tubular receiving region with the grommet body such that the harness and the resilient cushion extend within the tubular receiving region.

B2. The method of paragraph B1, wherein the grommet includes the grommet of any of paragraphs A1-A69.

B3. The method of any of paragraphs B1-B2, wherein the operatively interlocking the first body portion with the second body portion includes locating a body band within a body recess that is defined by the first body portion and by the second body portion.

B4. The method of any of paragraphs B1-B3, wherein the method further includes retaining the grommet within the aperture with a retention mechanism.

B5. The method of paragraph B4, wherein the retaining includes threading a flange onto the grommet body to compress the structural component between the flange and a body stop that extends from the grommet body.

B6. The method of paragraph B5, wherein the retaining includes adjusting a distance between the flange and the body stop, via the threading, to contact the structural component with both the body stop and the flange.

B7. The method of any of paragraphs B5-B6, wherein, prior to the threading, the method includes operatively interlocking a first flange portion with a second flange portion to define the flange.

B8. The method of paragraph B7, wherein the operatively interlocking the first flange portion with the second flange portion includes locating a flange band within a flange recess that is defined by the first flange portion and by the second flange portion.

B9. The method of any of paragraphs B4-B8, wherein the retaining includes deforming a resilient tab to extend the grommet body through the aperture and locate the structural component between the resilient tab and a/the body stop that extends from the grommet body.

B10. The method of any of paragraphs B1-B9, wherein the method further includes adhering the grommet to the structural component, optionally without adhering the grommet to the harness.

B11. The method of any of paragraphs B1-B10, wherein the harness includes an electrical power harness, wherein the method further includes flowing an electric current through the electrical power harness, and further wherein the method includes permitting an air flow through an air channel within the electrical power harness during the flowing.

B12. The method of any of paragraphs B1-B11, wherein the locating the resilient cushion includes locating the resilient cushion as a solid.

As used herein, the terms "selective" and "selectively," when modifying an action, movement, configuration, or other activity of one or more components or characteristics of an apparatus, mean that the specific action, movement, configuration, or other activity is a direct or indirect result of user manipulation of an aspect of, or one or more components of, the apparatus.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

The invention claimed is:

1. A grommet for supporting a harness within an aperture that is defined by a structural component, the grommet comprising:
a grommet body configured to be received within the aperture and to extend between the harness and the structural component when the harness and the grommet body are received within the aperture, wherein the grommet body defines a tubular receiving region sized to receive the harness such that the grommet body encircles at least an encircled portion of the harness, and further wherein the grommet body includes a body stop that extends from the grommet body;
a resilient cushion located within the tubular receiving region and configured to extend between the harness and the grommet body when the harness is received within the tubular receiving region, wherein the resilient cushion is shaped to retain the harness at a desired cross-sectional location within the tubular receiving region, and further wherein the resilient cushion is formed from a different material than a material of the grommet body; and
a retention mechanism configured to selectively retain the grommet body within the aperture, wherein the retention mechanism includes a plurality of resilient tabs that extends from the grommet body, wherein the plurality of resilient tabs includes at least a first resilient tab and a second resilient tab, wherein the first resilient tab and the second resilient tab are spaced apart from the body stop along a longitudinal length of the grommet body, wherein a first distance between the first resilient tab and the body stop is different from a second distance between the second resilient tab and the body stop, and further wherein:
(i) the first distance is selected to operatively retain the structural component between the first resilient tab and the body stop when the grommet is located within an aperture with a first aperture depth; and
(ii) the second distance is selected to operatively retain the structural component between the second resilient tab and the body stop when the grommet is located within an aperture with a second aperture depth, wherein the first aperture depth is different from the second aperture depth.

2. The grommet of claim 1, wherein the plurality of resilient tabs is configured to be deformed to permit the grommet to be inserted into the aperture.

3. The grommet of claim 1, wherein the grommet body has a tubular inner surface that defines the tubular receiving region, wherein the resilient cushion extends across at least a portion of the tubular inner surface, and further wherein the resilient cushion extends across at least a portion of the encircled portion of the harness.

4. The grommet of claim 1, wherein the resilient cushion is sized to center the harness within a transverse cross-section of the tubular receiving region, and further wherein the retention mechanism is configured to center the grommet body within a transverse cross-section of the aperture.

5. The grommet of claim 1, wherein the resilient cushion is formed from at least one of a resilient material, an elastomeric material, and a flexible material.

6. The grommet of claim 1, wherein the resilient cushion is configured to be located within the tubular receiving region as a solid and defines a hollow tubular shape prior to being located within the tubular receiving region.

7. The grommet of claim 1, wherein the grommet body includes a first body portion and a second body portion that together define the tubular receiving region, wherein the first body portion and the second body portion are operatively attached to one another to form the grommet body, and further wherein the first body portion and the second body portion define opposed halves of the grommet body.

8. The grommet of claim 7, wherein the first body portion and the second body portion are sized to permit installation of the grommet onto an existing harness that already extends through the aperture.

9. The grommet of claim 1, wherein the aperture defines an aperture depth, and further wherein the retention mechanism is at least one of (i) configured to retain the grommet body within the aperture when the aperture depth is within a predetermined aperture depth range and (ii) configured to retain the grommet body within a variety of apertures with respective aperture depths that vary by at least the predetermined aperture depth range.

10. An aircraft, comprising:
a harness;
a structural component that defines an aperture; and
the grommet of claim 1, wherein:
(i) the grommet body is received within the aperture and retained within the aperture with the retention mechanism; and
(ii) the harness extends through the tubular receiving region.

11. The aircraft of claim 10, wherein the harness includes a plurality of air channels that extends between a first side of the tubular receiving region and a second side of the tubular receiving region.

12. A method of installing the grommet of claim 1 in the aperture that is defined by the structural component, wherein the harness extends through the aperture, the method comprising:
locating the resilient cushion around an external surface of the harness;
locating a first body portion and a second body portion around an external surface of the resilient cushion;
operatively interlocking the first body portion with the second body portion to form the grommet body, wherein the operatively interlocking includes defining the tubular receiving region with the grommet body such that the harness and the resilient cushion extend within the tubular receiving region; and
retaining the grommet within the aperture with the retention mechanism, wherein the retaining includes deforming at least one resilient tab of the plurality of resilient tabs to extend the grommet body through the aperture and locate the structural component between the at least one resilient tab and the body stop that extends from the grommet body.

13. The method of claim 12, wherein, prior to the locating the resilient cushion, the resilient cushion is a solid, and further wherein the locating the resilient cushion includes locating the resilient cushion as the solid.

14. The grommet of claim 3, wherein the resilient cushion extends across an entirety of the encircled portion of the harness.

15. The method of claim 12, wherein the locating the first body portion and the second body portion is subsequent to the locating the resilient cushion.

\* \* \* \* \*